United States Patent
Wolrich et al.

(12)

(10) Patent No.: US 6,631,462 B1
(45) Date of Patent: Oct. 7, 2003

(54) MEMORY SHARED BETWEEN PROCESSING THREADS

(75) Inventors: Gilbert Wolrich, Framingham, MA (US); Matthew J. Adiletta, Ware, MA (US); William Wheeler, Southboro, MA (US); Daniel Cutter, Shrewsbury, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/479,377

(22) Filed: Jan. 5, 2000

(51) Int. Cl.[7] .................. G06F 9/312; G06F 12/00; G06F 13/16
(52) U.S. Cl. .................. 712/225; 712/201; 712/202; 712/23; 711/132; 709/106
(58) Field of Search ................ 712/228, 202, 712/217, 225, 201, 23; 711/123, 132; 703/20, 13; 709/104, 105, 108, 400, 315, 106, 107; 710/113; 717/148, 149, 163, 166, 172, 165

(56) References Cited

U.S. PATENT DOCUMENTS

| | | | | |
|---|---|---|---|---|
| 5,542,070 A | * | 7/1996 | LeBlanc et al. | 703/20 |
| 5,905,889 A | | 5/1999 | Wilhelm, Jr. | 709/104 |
| 5,946,487 A | * | 8/1999 | Dangelo | 717/148 |

FOREIGN PATENT DOCUMENTS

EP 0 809 180 11/1997

OTHER PUBLICATIONS

Hyde, R. "Overview of Memory Management" *Byte* 13(4) (1998): 219–225.

* cited by examiner

*Primary Examiner*—Daniel H. Pan
(74) *Attorney, Agent, or Firm*—Fish & Richardson P.C.

(57) ABSTRACT

A method includes pushing a datum onto a stack by a first processor and popping the datum off the stack by a second processor.

29 Claims, 11 Drawing Sheets

MEMORY SHARED BETWEEN PROCESSING THREADS

BACKGROUND

The invention relates to memory shared between processing threads.

A computer thread is a sequence or stream of computer instructions that performs a task. A computer thread is associated with a set of resources or a context.

SUMMARY

In one general aspect of the invention, a method includes pushing a datum onto a stack by a first processor and popping the datum off the stack by the second processor.

Advantages and other features of the invention will become apparent from the following description and from the claims.

BRIEF DESCRIPTION OF THE DRAWINGS

FIGS. 2-1 through 2-2 are block diagrams of a MicroEngine employed in the hardware-based multi-threaded processor of FIG. 1.

DETAILED DESCRIPTION

Figure 1:
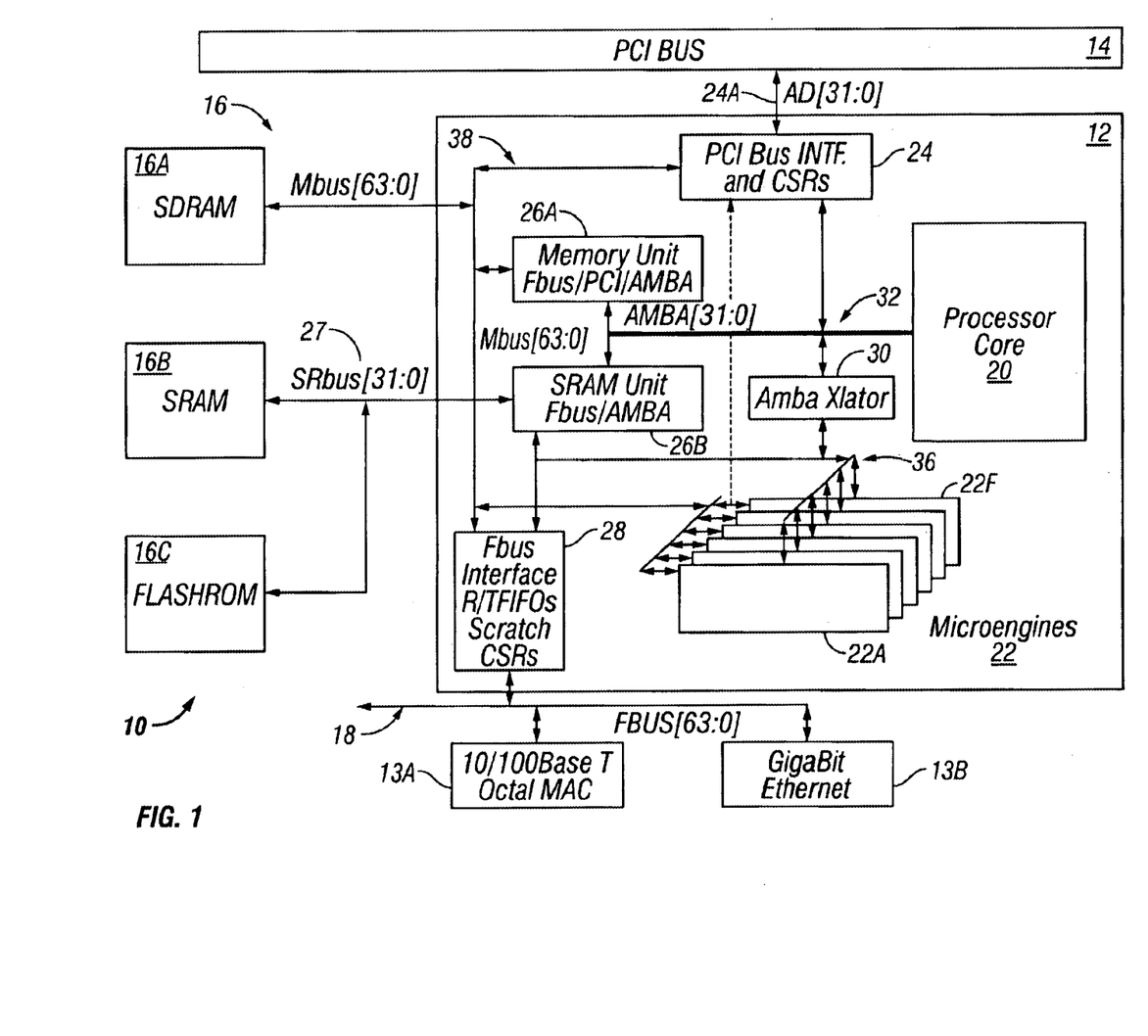
FIG. 1 is a block diagram of a system employing a hardware-based multi-threaded processor.

Referring to FIG. 1, a system 10 includes a parallel, hardware-based multithreaded processor 12. The hardware-based multithreaded processor 12 is coupled to a bus 14, a memory system 16 and a second bus 18. The bus 14 complies with the Peripheral Component Interconnect Interface, revision 2.1, issued Jun. 1, 1995 (PCI). The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple MicroEngines 22 each with multiple hardware controlled threads that can be simultaneously active and independently work on a task.

The hardware-based multithreaded processor 12 also includes a central controller 20 that assists in loading microcode control for other resources of the hardware-based multithreaded processor 12 and performs other general-purpose computer type functions such as handling protocols, exceptions, and extra support for packet processing where the MicroEngines pass the packets off for more detailed processing such as in boundary conditions. In one embodiment, the processor 20 is a StrongArm (TM) (StrongArm is a trademark of ARM Limited, United Kingdom) based architecture. The generalpurpose microprocessor 20 has an operating system. Through the operating system, the processor 20 can call functions to operate on MicroEngines 22a–22f. The processor 20 can use any supported operating system preferably a real time operating system. For the core processor implemented as a StrongArm architecture, operating systems such as, Microsoft NT real-time, and VXWorks and μC/OS, a freeware operating system available over the Internet can be used.

The hardware-based multithreaded processor 12 also includes a plurality of functional MicroEngines 22a–22f. Functional MicroEngines (MicroEngines) 22a–22f each maintain a plurality of program counters in hardware and states associated with the program counters. Effectively, a corresponding plurality of sets of threads can be simultaneously active on each of the MicroEngines 22a–22f while only one is actually operating at any one time.

In one embodiment, there are six MicroEngines 22a–22f as shown. Each MicroEngines 22a–22f has capabilities for processing four hardware threads. The six MicroEngines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six MicroEngines 22a–22f access either the SDRAM 16a or SRAM 16b based on characteristics of the data. Thus, low latency, low bandwidth data is stored in and fetched from SRAM, whereas higher bandwidth data for which latency is not as important, is stored in and fetched from SDRAM. The MicroEngines 22a–22f can execute memory reference instructions to either the SDRAM controller 26a or SRAM controller 16b.

Advantages of hardware multithreading can be explained by SRAM or SDRAM memory accesses. As an example, an SRAM access requested by a Thread_0, from a MicroEngine, will cause the SRAM controller 26b to initiate an access to the SRAM memory 16b. The SRAM controller controls arbitration for the SRAM bus, accesses the SRAM 16b, fetches the data from the SRAM 16b, and returns data to a requesting MicroEngine 22a–22b. During an SRAM access, if the MicroEngine e.g., 22a had only a single thread that could operate, that MicroEngine would be dormant until data was returned from the SRAM. By employing hardware context swapping within each of the MicroEngines 22a–22f, the hardware context swapping enables other contexts with unique program counters to execute in that same MicroEngine. Thus, another thread e.g., Thread_1 can function while the first thread, e.g., Thread_0, is awaiting the read data to return. During execution, Thread_1 may access the SDRAM memory 16a. While Thread_1 operates on the SDRAM unit, and Thread_0 is operating on the SRAM unit, a new thread, e.g., Thread_2 can now operate in the MicroEngine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one MicroEngine 22a and have one more thread available to process more work in the data path.

The hardware context swapping also synchronizes completion of tasks. For example, two threads could hit the same shared resource e.g., SRAM. Each one of these separate functional units, e.g., the FBUS interface 28, the SRAM controller 26a, and the SDRAM controller 26b, when they complete a requested task from one of the MicroEngine thread contexts reports back a flag signaling completion of an operation. When the MicroEngine receives the flag, the MicroEngine can determine which thread to turn on.

One example of an application for the hardware-based multithreaded processor 12 is as a network processor. As a network processor, the hardware-based multithreaded processor 12 interfaces to network devices such as a media access controller device e.g., a 10/100 BaseT Octal MAC 13a or a Gigabit Ethernet device 13b. The Gigabit Ethernet device 13b complies with the IEEE 802.3z standard, approved in June 1998. In general, as a network processor, the hardware-based multithreaded processor 12 can interface to any type of communication device or interface that receives/sends large amounts of data. Communication system 10 functioning in a networking application could receive a plurality of network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, i.e., RAID disk storage. A further use is as a matching engine. In the securities industry for example, the advent of electronic trading requires the use of electronic matching engines to match orders between buyers and sellers. These and other parallel types of tasks can be accomplished on the system 10.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, used to interface to Media Access Controller (MAC) devices.

The processor 12 includes a second interface e.g., a PCI bus interface 24 that couples other system components that reside on the PCI 14 bus to the processor 12. The PCI bus interface 24, provides a high-speed data path. 24a to memory 16 e.g., the SDRAM memory 16a. Through that path data can be moved quickly from the SDRAM 16a through the PCI bus 14, via direct memory access (DMA) transfers. The hardware based multithreaded processor 12 supports image transfers. The hardware based multithreaded processor 12 can employ a plurality of DMA channels so if one target of a DMA transfer is busy, another one of the DMA channels can take over the PCI bus to deliver information to another target to maintain high processor 12 efficiency. Additionally, the PCI bus interface 24 supports target and master operations. Target operations are operations where slave devices on bus 14 access SDRAMs through reads and writes that are serviced as a slave to target operation. In master operations, the processor core 20 sends data directly to or receives data directly from the PCI interface 24.

Each of the functional units is coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceeds the bandwidth of external buses coupled to the processor 12. The processor 12 includes an internal core processor bus 32, e.g., an ASB bus (Advanced System Bus) that couples the processor core 20 to the memory controller 26a, 26c and to an ASB translator 30 described below. The ASB bus is a subset of the so-called AMBA bus that is used with the Strong Arm processor core. The processor 12 also includes a private bus 34 that couples the MicroEngine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Figure 21:
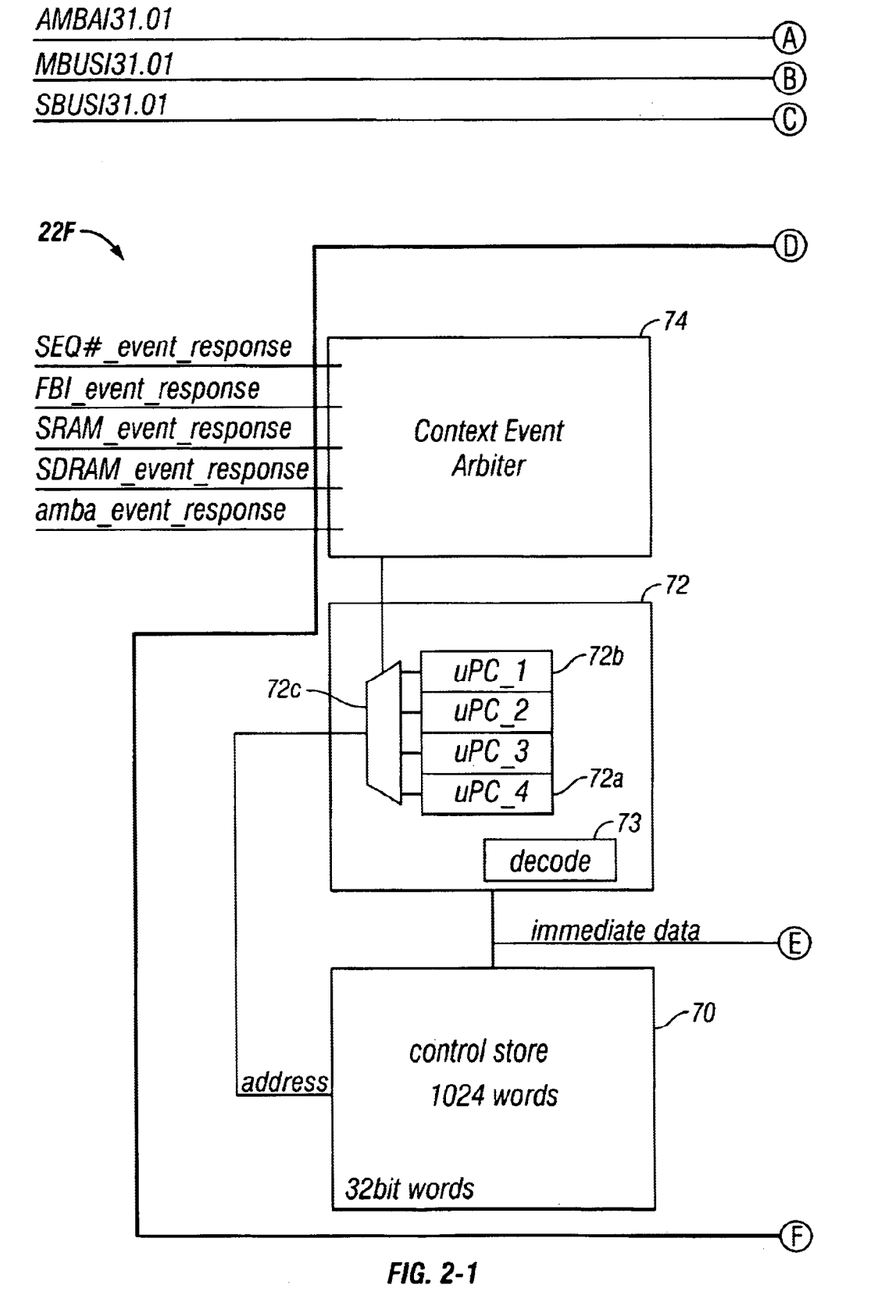
Figure 22:
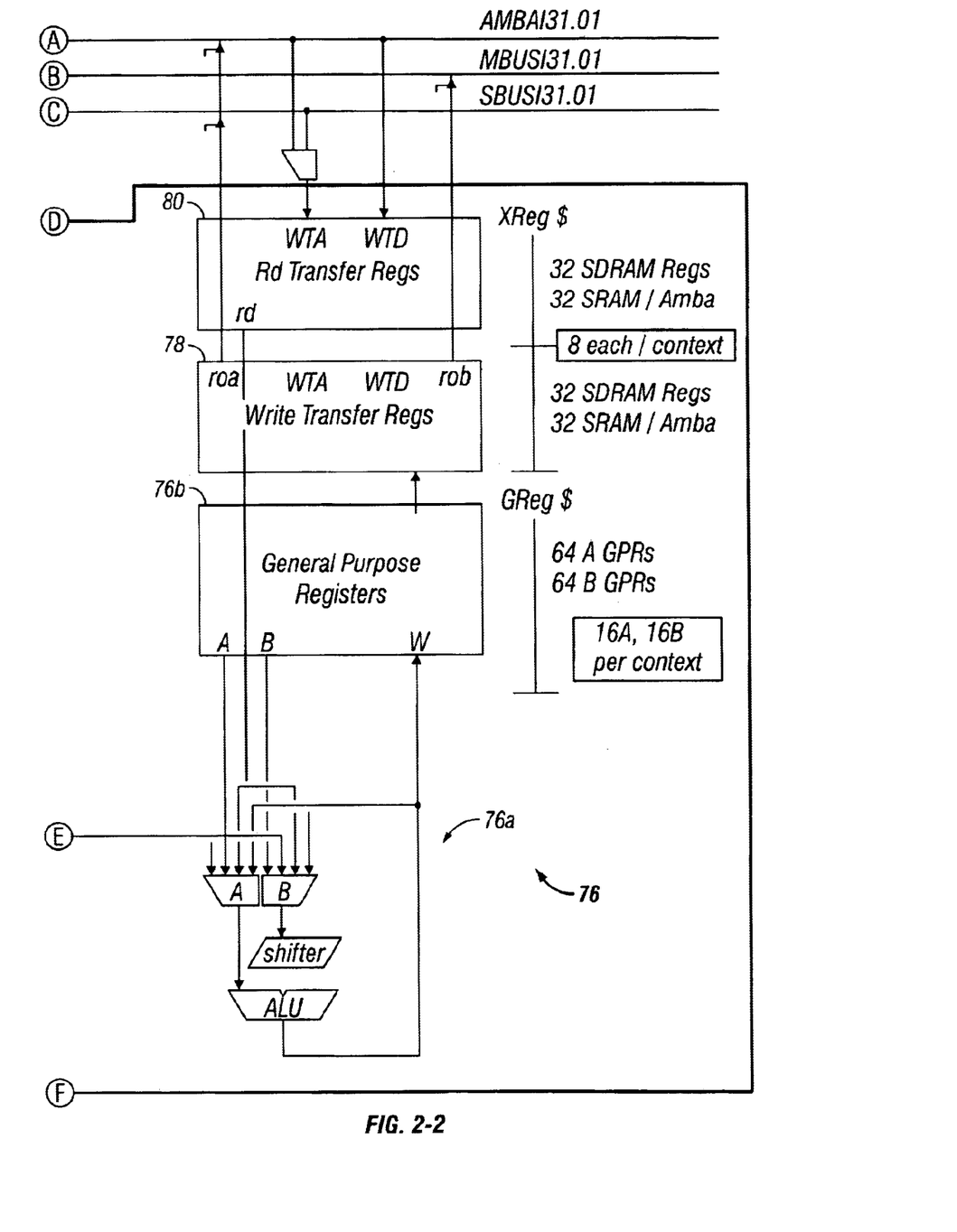

Referring to FIG. 2, an exemplary one of the MicroEngines 22a–22f, e.g., MicroEngine 22f is shown. The MicroEngine includes a control store 70, which, in one implementation, includes a RAM of here 1,024 words of 32 bit. The RAM stores a microprogram. The microprogram is loadable by the core processor 20. The MicroEngine 22f also includes controller logic 72. The controller logic includes an instruction decoder 73 and program counter (PC) units 72a–72d. The four micro program counters 72a–72d are maintained in hardware. The MicroEngine 22f also includes context event switching logic 74. Context event logic 74 receives messages (e.g., SEQ_#_EVENT_RESPONSE; FBI_EVENT_RESPONSE; SRAM_EVENT_RESPONSE; SDRAM_EVENT_RESPONSE; and ASB_EVENT_RESPONSE) from each one of the shared resources, e.g., SRAM 26a, SDRAM 26b, or processor core 20, control and status registers, and so forth. These messages provide information on whether a requested function has completed. Based on whether or not a function requested by a thread has completed and signaled completion, the thread needs to wait for that completion signal, and if the thread is enabled to operate, then the thread is placed on an available thread list (not shown). The MicroEngine 22f can have a maximum of e.g., 4 threads available.

In addition to event signals that are local to an executing thread, the MicroEngines 22 employ signaling states that are global. With signaling states, an executing thread can broadcast a signal state to all MicroEngines 22. Receive Request Available signal, Any and all threads in the MicroEngines can branch on these signaling states. These signaling states can be used to determine availability of a resource or whether a resource is due for servicing.

The context event logic 74 has arbitration for the four (4) threads. In one embodiment, the arbitration is a round robin mechanism. Other techniques could be used including priority queuing or weighted fair queuing. The MicroEngine 22f also includes an execution box (EBOX) data path 76 that includes an arithmetic logic unit 76a and general-purpose register set 76b. The arithmetic logic unit 76a performs arithmetic and logical functions as well as shift functions. The registers set 76b has a relatively large number of general-purpose registers. As will be described in FIG. 6, in this implementation there are 64 general-purpose registers in a first bank, Bank A and 64 in a second bank, Bank B. The general-purpose registers are windowed as will be described so that they are relatively and absolutely addressable.

The MicroEngine 22f also includes a write transfer register 78 and a read transfer 80. These registers are also windowed so that they are relatively and absolutely addressable. Write transfer register 78 is where write data to a resource is located. Similarly, read register 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the thread that the data is available or has been sent. Both transfer register banks 78 and 80 are connected to the execution box (EBOX) 76 through a data path. In one implementation, the read transfer register has 64 registers and the write transfer register has 64 registers.

Figure 3:
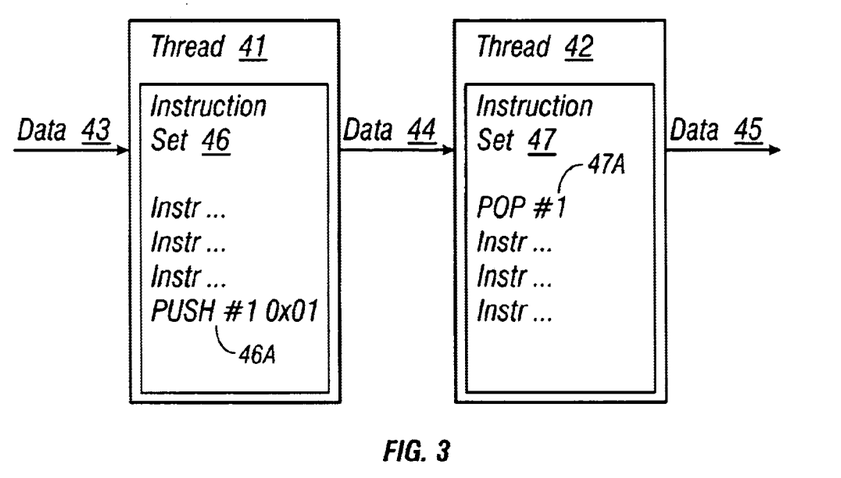
FIG. 3 is a block diagram showing instruction sets of two threads that are executed on the MicroEngines of FIGS. 1 and 2.

Referring to FIG. 3, processor 12 has processing threads 41 and 42 executing in MicroEngines 22a and 22b respectively. In other instances, the threads 41 and 42 may be executed on the same MicroEngine. The processing threads may or may not share data between them. For example, in FIG. 3, processing thread 41 receives data 43 and processes it to produce data 44. Processing thread 42 receives and possesses the data 44 to produce output data 45. Threads 41 and 42 are concurrently active.

Because the MicroEngines 22a and 22b share SDRAM 16a and SRAM 16b (memory), one MicroEngines 22a may need to designate sections of memory for its exclusive use. To facilitate efficient allocation of memory sections, the SDRAM memory is divided into memory segments, referred to as buffers. The memory locations in a buffer share a common address prefix, or pointer. The pointer is used by the processor as an identifier for a buffer.

Pointers to buffers that are not currently in use by a processing thread are managed by pushing the pointers onto a free memory stack. A thread can allocate a buffer for use by the thread by popping a pointer off the stack, and using the pointer to access the corresponding buffer. When a processing thread no longer needs a buffer that is allocated to the processing thread, the thread pushes the pointer to the buffer onto the stack to make the buffer available to other threads.

The threads 41 and 42 have processor instruction sets 46, 47 that respectively include a "PUSH" 46a and a "POP" 47A instruction. Upon executing either the "PUSH" or the "POP" instruction, the instruction is transmitted to a logical stack module 56 (FIG. 4).

Figure 4:
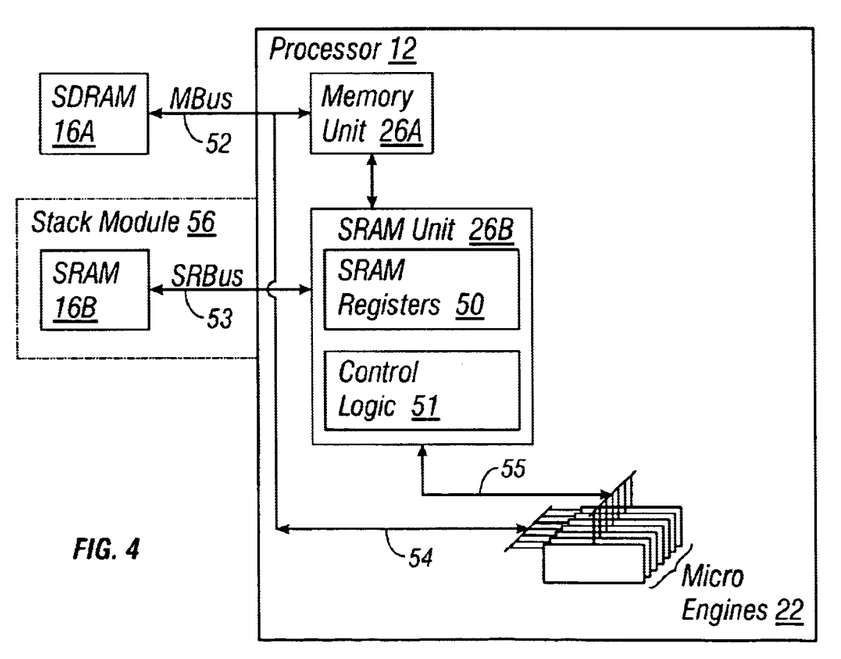
FIG. 4 is a simplified block diagram of the system of FIG. 1 showing selected sub-systems of the processor including a stack module.

Referring to FIG. 4, a section of the processor 9 and SRAM 16b provide the logical stack module 56. The logical stack module is implemented as a linked list of SPAM addresses. Each SRAM address on the linked list contains the address of the next item on the list. As a result, if you have the address of the first item on the list, you can read the contents of that address to find the address of the next item on the list, and so on. Additionally, each address on the linked list is associated with a corresponding memory buffer. Thus the stack module 56 is used to implement a linked list of memory buffers. While in use, the linked list allows the stack to increase or decrease in size as needed.

The stack module 56 includes control logic 51 on the SRAM unit 26b. The control logic 51 performs the necessary operations on the stack while SRAM 16b stores the contents of the stack. One of SRAM registers 50 is used to store the address of the first SRAM location on the stack. The address is also a pointer to the first buffer on the stack.

Although the different components of the stack module 56 and the threads will be explained using an example that uses hardware threads and stack modules, the stack can also be implemented in operating system software threads using software modules. Thread 41 and thread 42 may be implemented as two operating system threads which execute "PUSH" and "POP" operating system commands to allocate memory from a shared memory pool. The operating system commands may include calls to a library of functions written in the "C" programming language. In the operating system example, the equivalents of the control logic 51, the SRAM registers 50 and SRAM 16B are implemented using software within the operating system. The software may be stored in a hard disk, a floppy disk, computer memory, or other computer readable medium.

Figure 5A:
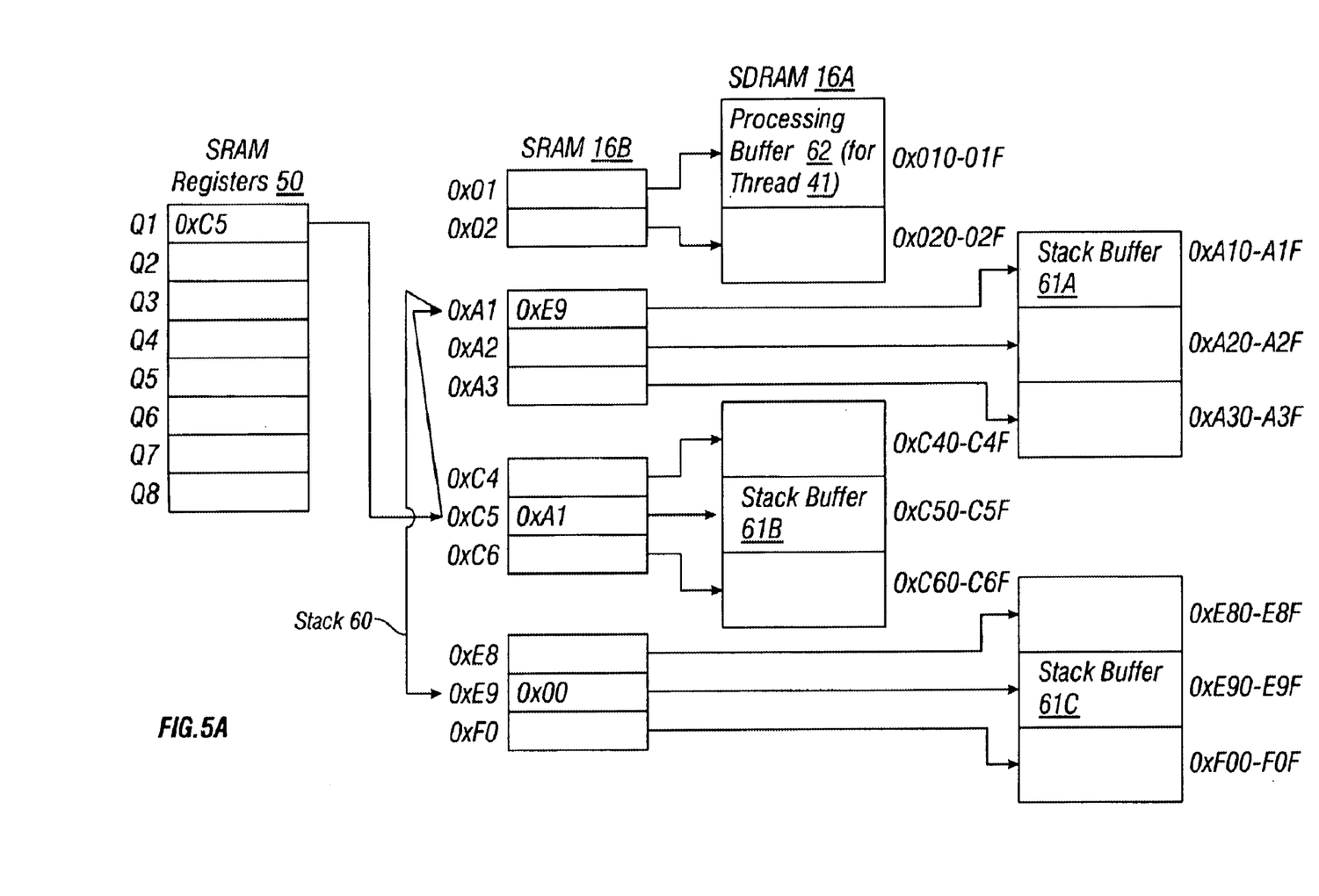
FIG. 5A is a block diagram showing the memory components of the stack module of FIG. 4.

Referring to FIG. 5A, SRAM register Q1 stores an address (0xC5) of the first item on the stack 60. The SRAM location (0xC5) of the first item on the stack 60 is used to store the SRAM address (0xA1) of the second item on the stack 60. The SRAM location (0xA1) of the second item on the stack 60 is used to store the address of the third item on the stack 60, etc. The SRAM location (0xE9) of the last item on the stack stores a pre-determined invalid address (0x00), which indicates the end of the linked list.

Additionally, the addresses of the items (0xC5, 0xA1, and 0xE9) on the stack 60 are pointers to stack buffers 61a, 61b, 61c contained within SDRAM 16A. A pointer to a buffer is pushed onto the stack by thread 41, so that the buffer is available for use by other processing threads. A buffer is popped by thread 42 to allocate the buffer for use by thread 42. The pointers are used as an address base to access memory locations in the buffers.

In addition to stack buffers 61a–c, SDRAM 16A also contains processing buffer 62, which is allocated to thread 41. The pointer to processing buffer 62 is not on the stack because it is not available for allocation by other threads. Thread 41 may later push a pointer to the processing buffer 62 onto the stack when it no longer needs the buffer 62.

Figure 5B:
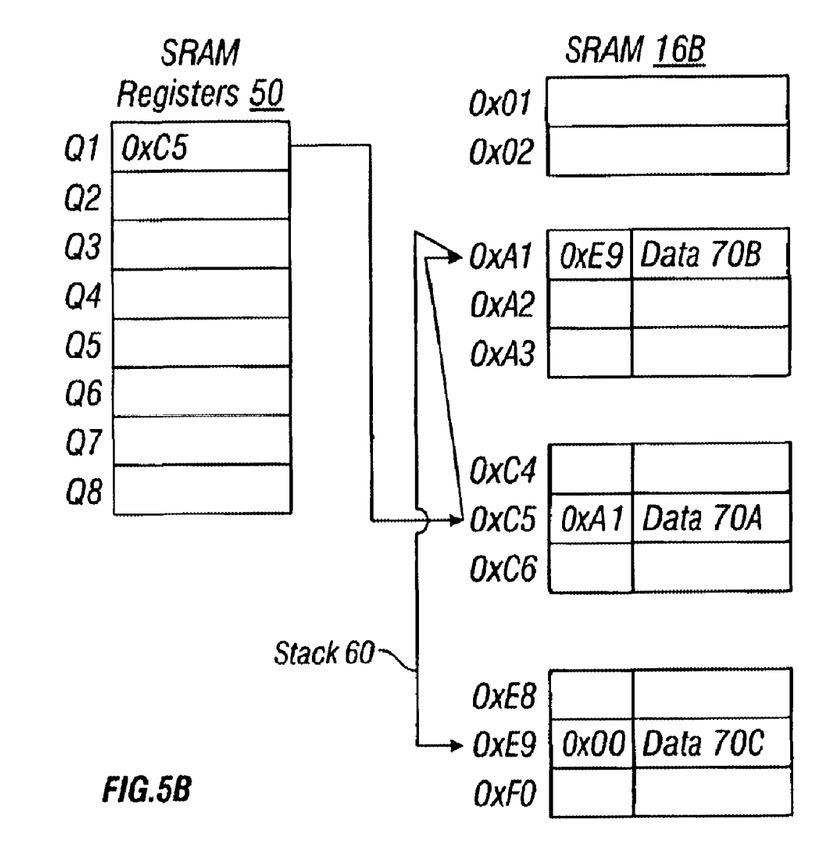
FIG. 5B is a block diagram showing the memory components of an alternate implementation of the stack module of FIG. 4.

Although the stack will be discussed with reference to the buffer management scheme above, it can be used without buffers. Referring to FIG. 5B, the SRAM locations 0xC5, 0xA1, and 0xE9 may, respectively, contain data 70a, 70b, and 70c in addition to an address to the next item on the list. Such a scheme may be used to store smaller units of data 70a–c on the stack. In such a scheme, the control logic would assign a memory location within the SRAM for storing the unit of data (datum) that is to be pushed onto the stack. The datum pushed onto the stack may be text, numerical data, or even an address or pointer to another memory location.

Figure 6A:
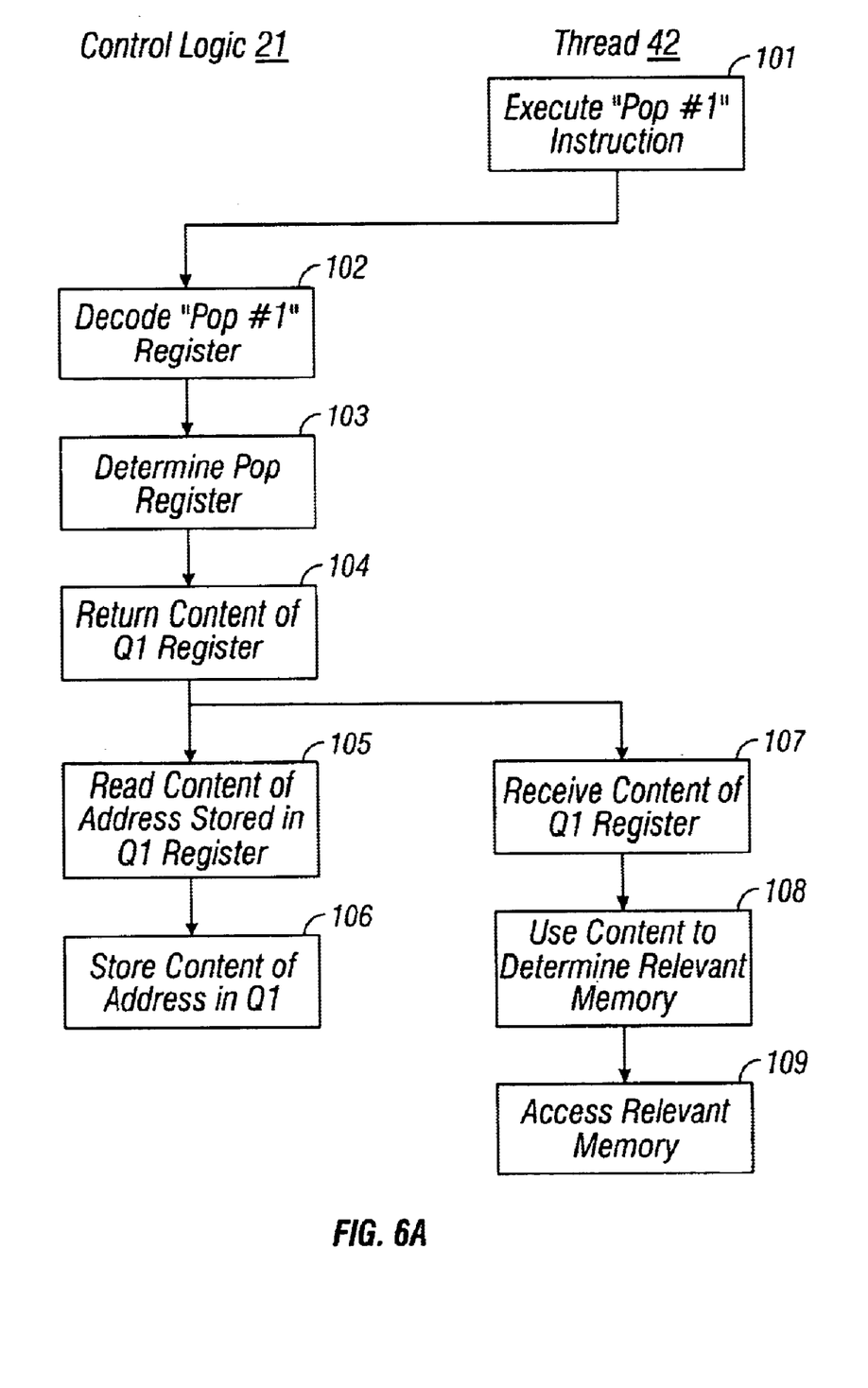
FIG. 6A is a flow chart of the process of popping a datum from the memory components of FIG. 5A.

Referring to FIG. 6A, to pop a datum off the stack stored in SRAM register Q1, thread 42 executes 101 the instruction "POP #1". The pop instruction is part of the instruction set of the MicroEngines 22. The pop instruction is transmitted to control logic 51 over bus 55 for stack processing. Control logic 51 decodes 102 the pop instruction. The control logic also determines 103 the register that contains a pointer to the stack that is referred to in the instruction based on the argument of the pop instruction. Since the argument to the pop instruction is "#1", the corresponding register is Q1. The control logic 51 returns 104 the contents of the Q1 register to the context of processing thread 42. The stack of FIG. 5A would return "0xC5". Processing thread 42 receives 107 the contents of the Q1 register, which is "0xC5", and uses 108 the received content to access data from the corresponding stack buffer 61b by appending a suffix to the content.

Control logic 27 reads 105 the content (0xA1) of the address (0xC5) stored in the Q1 register. Control logic 27 stores 106 the read content (0xA1) in the Q1 register to indicate that the 0xC5 has been removed from the stack and 0xA1 is now the item at the top of the stack.

Figure 6B:
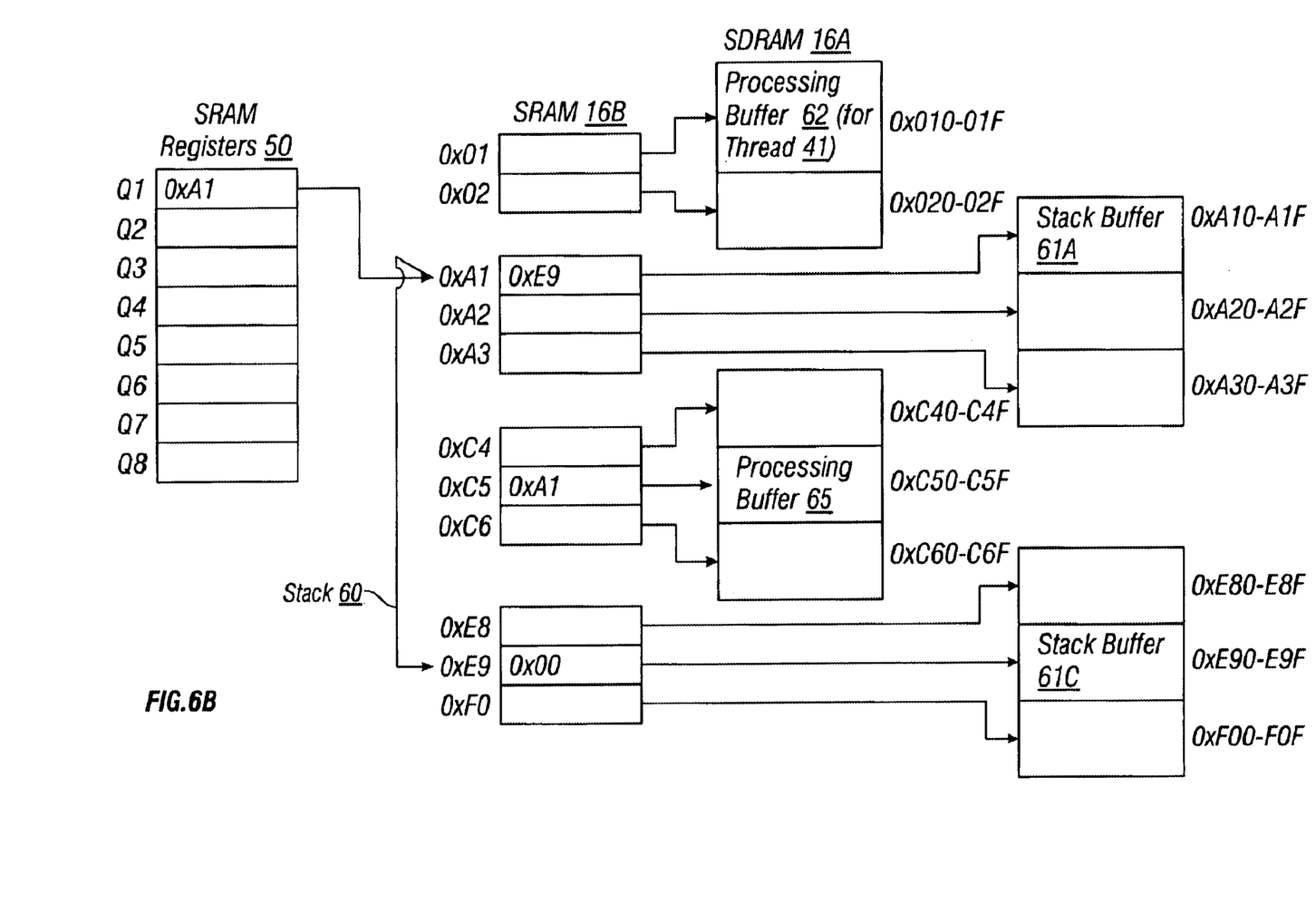
FIG. 6B is a block diagram showing the memory components of FIG. 5A after the popping process of FIG. 6A.

Referring to FIG. 6B, the state of the stack after the operations of FIG. 6A will be described. As shown, the register Q1 now contains the address 0xA1, which was previously the address of the second item on the stack. Additionally, the location that was previously stack buffer 61*b* (in FIG. 5A) is now processing buffer 65, which is used by thread 42. Thus, thread 42 has removed stack buffer 61*b* from the stack 60 and allocated the buffer 61*b* for its own use.

Figure 7A:
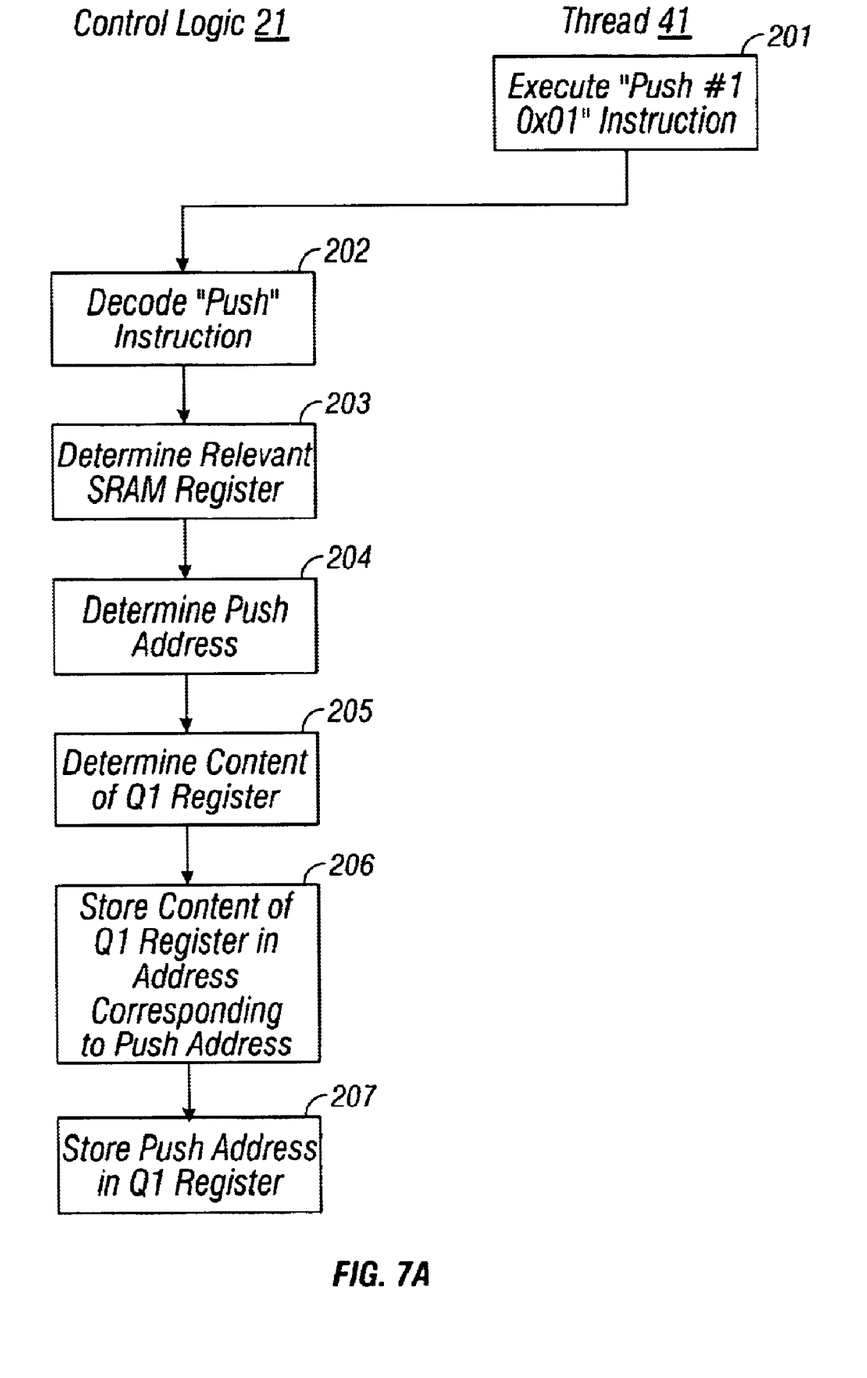
FIG. 7A is a flow chart of the process of pushing a datum on the memory components of FIG. 6B.

Referring to FIG. 7A, the process of adding a buffer to the stack will be described. Thread 41 pushes processing buffer 62 (shown in FIG. 6B) onto the stack by executing 201 the instruction "PUSH #1 0x01". The argument 0x01 is a pointer to the buffer 62 because it is a prefix that is common to the address space of the locations in the buffer. The push instruction is transmitted to control logic 51 over the bus 55.

Upon receiving the push instruction, the control logic 51 decodes 202 the instruction and determines 203 the SRAM register corresponding to the instruction, based on the second argument of the push instruction. Since the second argument is "#1", the corresponding register is Q1. The control logic 51 determines the address to be pushed from the third argument ( 0x01 ) of the push instruction. The control logic determines 205 the content of the Q1 register by reading the value of the register location. The value 0xA1 is the content of the Q1 register in the stack of FIG. 6B. The control logic stores 206 the content (0xA1) of the Q1 register in the SRAM location whose address is the push address (0x01). The control logic then stores 207 the push address (0x01) in the Q1 register.

Figure 7B:
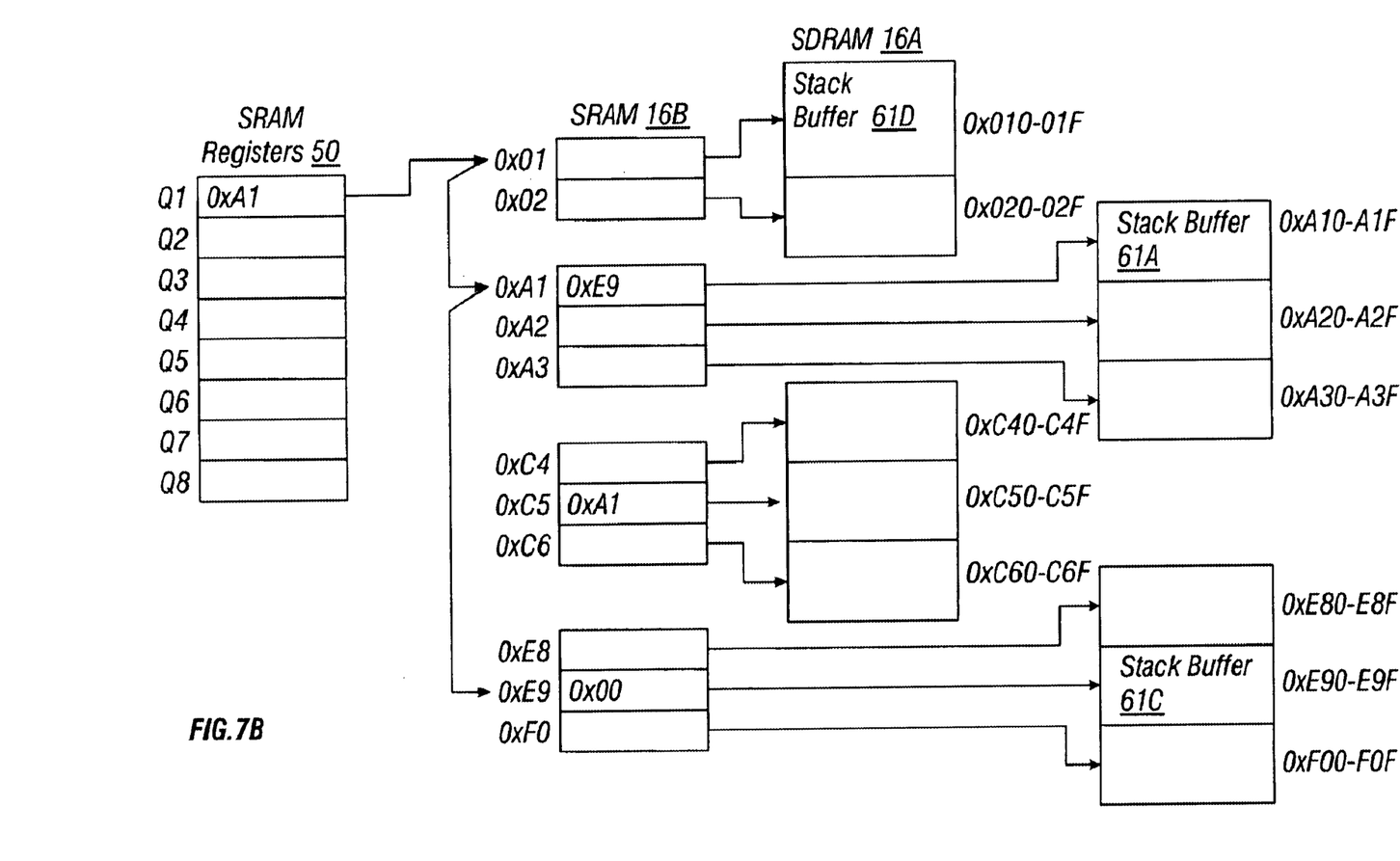
FIG. 7B is a block diagram showing the memory components of FIG. 6B after the pushing process of FIG. 7A.

Referring to FIG. 7B, the contents of the stack after the operations of FIG. 7A will be described. As shown, the SRAM register Q1, contains the address of the first location on the stack, which is now 0x01. The address of the first location on the stack is also the address of stack buffer 61d, which was previously a processing buffer 62 used by thread 41. The location 0xA1, which was previously the first item on the stack, is now the second item on the stack. Thus, thread 41 adds stack buffer 61d onto the stack to make it available for allocation to other threads. Thread 42 can later allocate the stack buffer 61d for its own use by popping it off the stack, as previously described for FIG. 6A.

Figure 8:
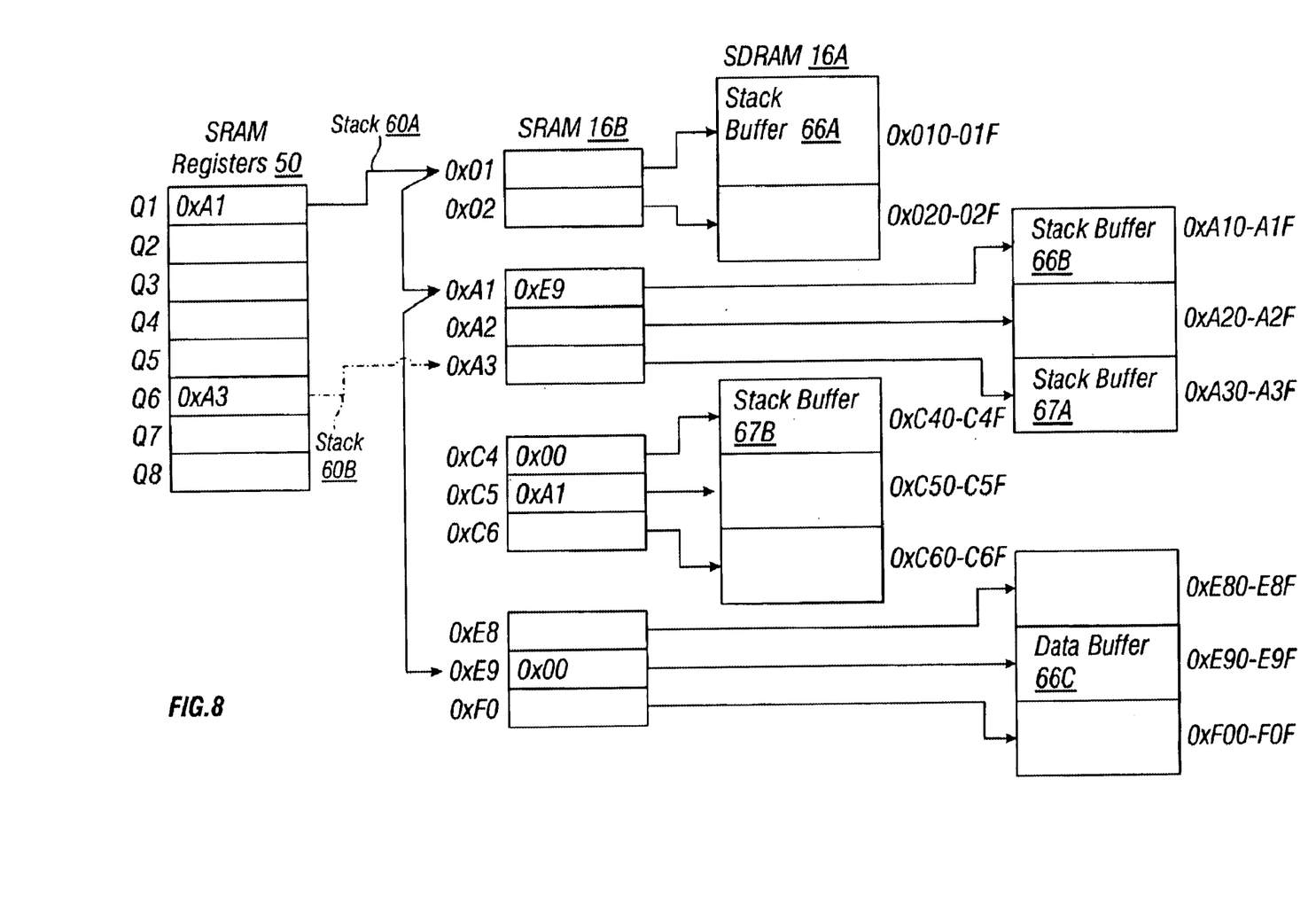
FIG. 8 is a block diagram showing memory components used to implement two stacks in one stack module.

Referring to FIG. 8, a second stack 60*b* (shown in phantom) may be implemented in the same stack module by using a second SRAM control register to store the address of the first element in the second stack 60*b*. The second stack may be used to manage a separate set of memory buffers, for example, within SRAM 16*b* or SDRAM 16*a*. A first stack 60*a* has the address of the first element on the stack 60*a* stored in SRAM register Qi. Additionally, a second stack 60*b* has the address of its first element stored in register Q6. The first stack 60*a* is identical to-the stack 60 in FIG. 7B. The second stack 60*b* is similar to previously described stacks.

Other embodiments are within the scope of the following claims. Although the stack 60 (shown in FIG. 5A) stores the pointer to the first element in a register Q1, the linked list in SRAM 16B and the buffers in SDRAM 16A, any of the stack module elements could be stored in any memory location. For example, they could all be stored in SRAM 16*b* or SDRAM 16*a*.

Other embodiments my implement the stack in a continuous address space, instead of using a linked list. The size of the buffers may be varied by using pointers (address prefixes) of varying length. For example, a short pointer is a prefix to more addresses and is, therefore, a pointer to a larger address buffer.

Alternatively, the stack may be used to manage resources other than buffers. One possible application of the stack might be to store pointers to the contexts of active threads that are not currently operating. When MicroEngine 22*a* temporarily sets aside a first active thread to process a second active thread, it stores the context of the first active thread in a memory buffer and pushes a pointer to that buffer on the stack. Any MicroEngine can resume the processing of the first active thread by popping the pointer to memory buffer containing the context of the first thread and loading that context. Thus the stack can be used to manage the processing of multiple concurrent active threads by multiple processing engines.

What is claimed is:

1. A method comprising:
   pushing a datum onto a stack by a first processing thread; and
   popping the datum off the stack by a second processing thread, wherein pushing comprises:
   executing a push command on the first processing thread, the push command having at least one argument,
   determining a pointer to a current stack datum,
   determining a memory location associated with an argument of the push command, and
   storing the determined pointer at the determined location.

2. The method of claim 1 wherein pushing further comprises:
   producing a pointer associated with the determined location the pointer to the current stack datum.

3. The method of claim 2 wherein determining a location comprises:
   decoding the push command.

4. The method of claim 2 wherein determining a location comprises:
   storing an argument of the pop command in a location associated with the argument of the push command.

5. The method of claim 2 wherein said push command is at least one of a processor instruction, and an operating system call.

6. The method of claim 1 wherein popping comprises:
   executing a pop command by the second processing thread,
   determining a pointer to a current stack datum,
   returning the determined pointer to the second processing thread,
   retrieving a pointer to a previous stack datum from a location associated with the pointer to the current stack datum, and
   assigning the retrieved pointer the pointer to the current stack datum.

7. The method of claim 6 wherein the location associated with the pointer to the current stack datum is the location that has an address equal to the value of the pointer to the current stack datum.

8. The method of claim 6 wherein the location associated with the pointer to the current stack datum is the location that has an address equal to the sum of an offset and the value of the pointer to the current stack datum.

9. The method of claim 6 wherein the pop command is at least one of a processor instruction or an operating system call.

10. The method of claim 1 further comprising:
storing data in a memory buffer that is accessible using a buffer pointer having the datum that is pushed onto the stack.

11. The method of claim 1 further comprising:
using the popped datum as a buffer pointer to access information stored in a memory buffer.

12. The method of claim 1 further comprising:
a third processing thread pushing a second datum onto the stack.

13. The method of claim 1 further comprising:
a third processing thread popping a second datum of the stack.

14. A system comprising:
a stack module that stores data by pushing it onto the stack and processing threads can retrieve information by popping the information off the stack,
a first processing thread having a first command set, including at least one command for pushing data onto the stack,
a second processing thread having a second command set, including at least one command for popping the data off the stack, and
a memory location associated with a first datum on the stack, the memory location including a pointer associated with a second datum which was stored on the stack prior to said first datum.

15. The system of claim 14 wherein the first and second processing threads are executed on a single microengine.

16. The system of claim 14 wherein the first and second processing threads are executed on separate microengines.

17. The system of claim 16 wherein the separate microengines are implemented on the same integrated circuit.

18. The system of claim 14 wherein the stack module and the processing threads are on the same integrated circuit.

19. The system of claim 14 where the first and second command sets are at least one of a processor instruction set and an operating system instruction set.

20. The system of claim 14 further comprising a bus interface for communicating between at least one of the processing threads and the stack module.

21. A stack module comprising:
control logic that responds to commands from at least two processing threads, the control logic storing a first datum on a stack structure in response to a push command and retrieving datum from the stack in response to a pop command, and
a memory location associated with a first datum on the stack, the memory location including a pointer associated with a second datum which was stored on the stack prior to said first datum.

22. The stack module of claim 21 further comprising a stack pointer associated with the most recently stored datum on the stack.

23. The stack module of claim 22 further comprising a second stack pointer associated with the most recently stored datum on a second stack.

24. The stack module of claim 22 wherein the stack pointer is a register on a processor.

25. The stack module of claim 22 wherein said memory location includes SRAM memory.

26. The stack module of claim 21 wherein the commands are processor instructions.

27. The stack module of claim 21 wherein the commands are operating system instructions.

28. An article comprising a computer-readable medium having stored thereon instructions that when executed by a machine results in the following:
push a datum onto a stack by a first processing thread; and
pop the datum off the stack by a second processing thread, wherein pushing comprises instructions having at least one argument that when executed by a machine results in the following:
determine a pointer to a current stack datum,
determine a memory location associated with an argument of the push command, and
store the determined pointer at the determined location.

29. The article of claim 28 further comprising instructions that when executed by a machine results in the following:
produce a pointer associated with determined location the pointer to the current stack datum.

* * * * *